United States Patent Office 3,187,018
Patented June 1, 1965

3,187,018
3-OXATRICYCLO[3.2.1.0²,⁴]OCTANE - 6 - METHANOLS, ETHERS AND ESTERS AND INTERMEDIATE PRODUCTS
Samuel W. Tinsley, South Charleston, and Paul S. Starcher, Charleston, W. Va., assignors to Union Carbide Corporation, a corporation of New York
No Drawing. Filed Apr. 16, 1959, Ser. No. 806,766
12 Claims. (Cl. 260—348)

This invention relates in general to a new class of organic compounds and more particularly to 3-oxatricyclo[3.2.1.0²,⁴]octane-6-methanols, ethers and esters thereof, together with intermediate products.

The compounds of this invention can be conveniently represented by the following general formula:

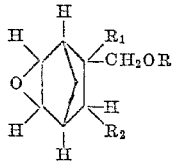

wherein $R_1$ and $R_2$ are members selected from the group consisting of hydrogen and alkyl radicals, and R is a member selected from the group consisting of hydrogen, aliphatic, cycloaliphatic and aromatic groups. Preferred compounds are those wherein R, $R_1$ and $R_2$ contain from 0 to 18 carbon atoms and R includes alkyl, alkenyl, alkoxy alkyl, acyl, and aryl radicals. Particularly preferred compounds are those wherein R is an unsaturated monovalent acyl group containing from 2 to 18 carbon atoms and $R_1$ and $R_2$ contain from 0 to 6 carbon atoms. Also particularly preferred are those compounds wherein R contains one epoxy group and includes epoxyaliphatic alkyl, epoxyaliphatic acyl, epoxycycloaliphatic alkyl, epoxycycloaliphatic acyl, epoxybicycloaliphatic alkyl or epoxybicycloaliphatic acyl groups.

Due to the presence of the epoxy group

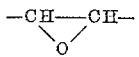

the novel compounds of this invention possess useful solvent properties. For example, they are compatible with many vinyl chloride and vinylidene chloride resins. Accordingly, many of the higher esters can be used as plasticizers for these and other resins. For example, the novel compounds of this invention containing two epoxy groups have been found useful as plasticizers with vinyl-halide resins. By incorporating into the resin from about 5 to about 50 percent by weight of these novel diepoxides, a plasticized product is obtained which possesses useful resilient and flexible characteristics. The vinyl halide resins which can be satisfactorily plasticized by the compounds of this invention can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. The compounds of this invention are also useful in the preparation of synthetic lubricants, tanning agents and biological preparations.

Furthermore, the novel compositions of matter of this invention are useful as intermediates in the preparation of a large number of new chemical compounds by virtue of the epoxy group which is capable of reacting with numerous compounds possessing one or more active hydrogen atoms such as, for example, phenols, alcohols, carboxylic acids, amides, amines, mercaptans and the like. These epoxides can also be polymerized, especially by Lewis acids, to form polymers useful for coatings and the like.

A particularly interesting novel class of compounds included within the scope of the present invention embraces epoxyester compounds which contain a reactive double bond in the acid moiety of the molecule as well as the epoxy group in the alcohol moiety. These compounds are especially useful and differ from compounds lacking unsaturation in that they can be converted to polymers through either the oxirane ring or the polymerizable double bond and thereafter cross-linked through whichever of these two was not used in the initial polymerization. Many of the resulting polymeric materials are useful as lubricants and as hydraulic fluids where high temperatures are encountered. Thus, the epoxyesters of this invention which contain a polymerizable bond in the acid moiety are particularly useful since they can be incorporated into polymers through the polymerizable linkage and the epoxy group subsequently used for cross-linking the resin.

It is accordingly an object of the present invention to provide new organic compounds which are suitable for use in the plastics and resins fields. Another object is to provide new compositions of matter comprising 3-oxatricyclo[3.2.1.0²,⁴]octane-6-methanol, alkyl substituted 3-oxatricyclo[3.2.1.0²,⁴]octane - 6 - methanols, ethers and esters thereof. Another object of the instant invention is to provide new compositions of matter comprising unsaturated acid esters of 3-oxatricyclo[3.2.1.0²,⁴]octane-6-methanol and unsaturated acid esters of alkyl substituted 3-oxatricyclo[3.2.1.0²,⁴]octane-6-methanol. A further object of the present invention is to provide new compositions of matter comprising esters and ethers of 3-oxatricyclo[3.2.1.2,⁴]octane - 6 - methanols containing at least two epoxy groups. A still further object of the present invention is to provide novel polymers and copolymers containing epoxy groups. Another object is to provide new polymers which can be cross-linked through said epoxy groups. A further object is to provide processes for the preparation of the novel compositions of matter of this invention. These and other objects will readily become apparent to those skilled in the art in the light of the teachings herein set forth.

The epoxides of this invention prepared from the oxidation of bicyclo[2.2.1]-5-heptene-2-methanols, ethers and esters are preferably named 3-oxatricyclo[3.2.1.0²,⁴]octane-6-methanols, ethers and esters thereof in accordance with the system of nomenclature adopted by the American Chemical Society for use in Chemical Abstracts.

In accordance with the process of this invention, the novel organic compounds are produced in high yields by the epoxidation of the olefinic linkage contained in the bicyclo[2.2.1]-5-heptene ring of the alcohol, ether or ester starting material. In the esters prepared from saturated carboxylic acids, the only double bond present is in the bicyclo[2.2.1]-5-heptene ring, and the epoxidation is effected quite easily. In the ester prepared from unsaturated carboxylic acids more than one site of unsaturation is present which can be epoxidized. In many of these compounds it has been observed that epoxidation can occur selectively. Thus, for 2,3-unsaturated esters the rate of epoxidation is very low compared to that of the double bonds in the bicycloheptene ring. Thus, by appropriate combinations of different olefinic groups an essentially complete selectivity can be achieved in the preparation of many epoxy unsaturated esters. Compounds which contain double bonds of approximately the same reactivity toward epoxidation can usually not be selectively epoxidized unless the epoxidizing agent is reacted with a large excess of diolefin.

The bicyclo[2.2.1]-5-heptene-2-methanols which are used as the starting materials for the present invention may be prepared by reacting cyclopentadiene with an allylic alcohol by the conventional Diels-Alder condensation wherein $R_1$ and $R_2$ are as indicated above:

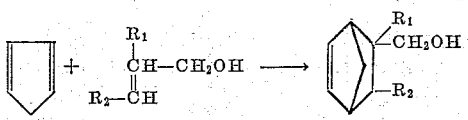

Thereafter the alcohol can be reacted with acids or other alcohols to produce the corresponding ester or ether. Other methods are also available for preparing the alcohol such as the Diels-Alder condensation of cyclopentadiene and an alpha, beta-unsaturated aldehyde followed by reduction to the alcohol. Thus as illustrative of one method of preparation of the starting materials of this invention cyclopentadiene can be reacted with allyl alcohol, 2-butenol, 2-methyl-2-butenol and the like to give respectively bicyclo[2.2.1]-5-heptene-2-methanol, 3-methyl-bicyclo[2.2.1]-5-heptene-2-methanol, 2,3-dimethyl-bicyclo[2.2.1]-5-heptene-2-methanol and the like. The preparation of starting materials suitable for use in the practice of the present invention are reported in the literature by Fields, J. Am. Chem. Soc. 76, 2709 (1954); Alder et al., Ber. 71B, 1939 (1938); and Nichols et al. U.S. 2,596,279.

Methods of preparation of the novel ethers of this invention can be effected by the Diels-Alder reaction of cyclopentadiene and an allyl ether such as diallyl ether, vinyl ether, allyl decyl ether and the like. The ethers may also be prepared by the Williams synthesis wherein the sodium salt of a bicyclo[2.2.1]-5-heptene methanol is reacted with an appropriate saturated or unsaturated halide according to known methods.

The acids suitable for use in preparing the esters of the unsaturated cycloaliphatic alcohols prior to epoxidation may be any suitable aliphatic, cycloaliphatic or aromatic carboxylic acid containing one or more carboxy groups. These acids may be saturated or unsaturated, substituted or unsubstituted and containing epoxy groups. Examples of such acids are acetic, chloroacetic, propionic, caproic, stearic, acrylic, methacrylic, crotonic, sorbic, 1-chlorobutyric, succinic, pimelic, benzoic, 3,5-dichlorobenzoic, p-methylbenzoic; cinnamic, and the like. Additional acids which may be used in the preparation of the esters include: 9,10-epoxystearic acid, 9,10,12,13-diepoxystearic acid, citraconic acid, 3-cyclohexenecarboxylic acid, 3,4-epoxycyclohexanecarboxylic acid, thiodibutyric acid, tetrachlorophthalic acid, benzenetricarboxylic acid, 4,5-epoxycyclohexane-1,2-dicarboxylic acid, 3 - oxatricyclo [3.2.1.0$^{2,4}$]octane-6-carboxylic acid, Δ$^9$-decylenic acid, and the like. It should be noted that the reaction to form the ester is conducted in such a manner that only one carboxy group of polycarboxylic acids reacts with the bicyclo[2.2.1]-5-heptene methanol. The unsaturated precursors for the synthesis of the epoxyesters of this invention need not be prepared by the reaction of the bicyclo[2.2.1]-5-heptene-2-methanol and an acid but can be prepared by other methods.

The ethers suitable for use as starting materials may be derived from aliphatic, cycloaliphatic or aromatic alcohols, such as ethanol, butanol, 2-ethylhexanol, dodecanol, ethylene glycol, glycerol, allyl alcohol, methallyl alcohol, crotyl alcohol, oleyl alcohol, cyclohexenyl alcohol, Δ$^3$-cyclohexanol, Δ$^3$-cyclohexenylmethanol, Δ$^2$-cyclopentenol, linoleyl alcohol, and the like. Additionally, the ethers derived from alcohols which have ether linkages such as diethylene glycol and triethylene glycol may likewise be employed. Alcohols containing epoxy groups may also be employed in the practice of this invention.

As previously indicated, the compounds of this invention are produced by the oxidation of the olefinic linkage contained in the corresponding bicyclo[2.2.1]-5-heptene-2-methanols, ethers and esters. Peracetic acid is particularly well suited for the oxidation of the olefinic linkages or epoxidation reaction, since this epoxidation reaction can be carried out under relatively mild conditions and with a minimum of operating difficulty.

In one embodiment of the present invention, the epoxidation of the unsaturated starting materials is carried out at temperatures in the range of from $-25°$ C. to $150°$ C. At the lower temperatures, the rate of epoxidation is slow while at the higher temperatures the rate is faster necessitating precautions to prevent further reaction of the epoxide groups. In order to avoid undesired side reactions and to provide a suitable reaction rate, temperatures in the range of from $10°$ C. to $90°$ C. are preferable. In the practice of the invention, the unsaturated starting material is conveniently charged to a reaction vessel and the appropriate quantity of peracetic acid is added. The mole ratio is not necessarily critical and can be varied over a wide range depending on whether the mono-, di-, or higher epoxy compound is desired. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxyester. Extraction with a suitable solvent, continuous distillation, or distillation under reduced pressures all are applicable to the recovery of the epoxide product.

Other peroxides such as perbenzoic acid, monoperphthalic acid, performic acid and hydroperoxides may be used as the epoxidizing agent, but for economic reasons, peracetic acid is more desirable for commercial application.

Thus, as illustrative of the compounds within the scope of the present invention and which can be prepared in a manner indicated above by the epoxidation of the aforementioned starting materials are the following:

3-oxatricyclo[3.2.1.0$^{2,4}$]octane-6-methanol,
6-methyl-3-oxatricyclo[3.2.1.0$^{2,4}$]octane-6-methanol,
6,7-dimethyl-3-oxatricyclo[3.2.1.0$^{2,4}$]octane-6-methanol,
6-butyl-3-oxatricyclo[3.2.1.0$^{2,4}$]octane-6-methanol,
3-oxatricyclo[3.2.1.0$^{2,4}$]octane-6-methyl acetate,
3-oxatricyclo[3.2.1.0$^{2,4}$]octane-6-methyl acrylate,
6-methyl-3-oxatricyclo[3.2.1.0$^{2,4}$]octane-6-methyl stearate,
3-oxatricyclo[3.2.1.0$^{2,4}$]octane-6-methyl benzoate,
3-oxatricyclo[3.2.1.0$^{2,4}$]octane-6-methyl-3,5-dichlorobenzoate,
3-oxatricyclo[3.2.1.0$^{2,4}$]octane-6-methyl ethyl ether,
3-oxatricyclo[3.2.1.0$^{2,4}$]octane-6-methyl 2-butoxy ethyl ether, and the like. Diepoxides which may also be prepared by the process of the present invention include, among others, the following compounds wherein Z represents the

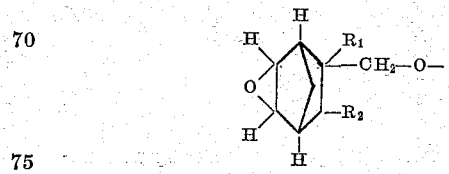

radical.

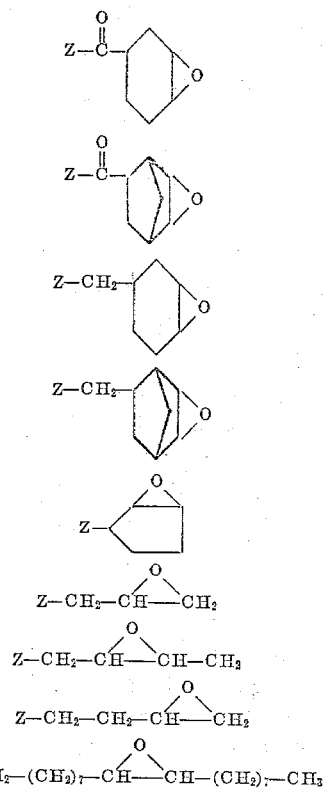

The above novel compounds have been given to demonstrate the breadth of the present invention and it is not to be inferred that the present invention is limited to the aforesaid compositions.

Copolymers of the 3-oxatricyclo[3.2.1.0$^{2,4}$]octane-6-methanol esters, containing terminal unsaturation in the acid moiety of the ester, can be prepared with a polymerizable ethylenically unsaturated compound. Examples of such compounds are vinyl and vinylidene halides such as vinyl chloride; acrylic acids, esters, nitriles and amides such as acrylic acid, methacrylic acid, methyl methacrylate; vinyl carboxylates such as vinyl acetate, vinyl butyrate and the like. The polymerization conditions are not critical and in general from about 0.01 to about 5 percent of a free radical producing initiator by weight of the total polymerizable components will give satisfactory results. The particular application of the resulting copolymer will be determinative of the relative proportions of the monomers used. The resulting thermoplastic resin can then be cross-linked through the epoxy group. Cross-linking can be effected by dissolving the copolymerized resin in a suitable solvent such as toluene and methyl isobutyl ketone, adding thereto from about 0.1 to about 3 percent of phosphoric acid or diethylenetriamine by weight of solution, and heating the mixture.

The compounds of the instant invention can also be homopolymerized through the terminal unsaturation contained in the acid moiety of the ester and the resulting polymer also cross-linked through the epoxy group. For the esters with no terminal unsaturation, the esters can be homopolymerized directly through the epoxy group itself by heating, for example, in the presence of a boron trifluoride-monoethylamine complex, whereby a viscous polymer is obtained.

The following examples illustrate the best mode presently contemplated for the preparation of the compounds of this invention.

EXAMPLE I

*Preparation of 3-oxatricyclo[3.2.1.0$^{2,4}$]octane-6-methanol*

To 434 grams of bicyclo[2.2.1]-hept-5-ene-2-methanol was added dropwise over a 3.5-hour period 11.95 grams of a 24.8 percent peracetic acid solution in ethyl acetate. The reaction mixture was maintained at 45–50° C. during the addition and for one hour thereafter. An analysis for peracetic acid indicated that slightly more than the theoretical amount of peracid has been consumed. The reaction mixture was co-distilled with ethylbenzene to remove the volatiles, i.e., ethyl acetate and acetic acid. After removal of the volatiles the product was distilled on an 8" x 1⅛" column packed with stainless steel protruded packing. There was obtained 347 grams of product consisting of a liquid and a solid phase and having a boiling range of 135° C. at a pressure of 0.6 millimeter of mercury to 120° C. at 0.3 millimeter. The liquid phase was characterized by the epoxide band at 11.75μ. *Analysis.*—Calc'd for $C_8H_{12}O_2$: C, 68.55; H, 8.63. Found: C, 68.60; H, 8.43.

EXAMPLE II

*Preparation of 3-oxatricyclo[3.2.1.0$^{2,4}$]octane-6-methyl acetate*

To 306 grams of bicyclo[2.2.1]-5-heptene-2-methyl acetate was added dropwise over 1-hour period 558 grams of a 27.2 percent solution of peracetic acid in ethyl acetate at 40° C. After an additional 2-hour reaction period at 40° C. the theoretical amount of peracetic acid had been consumed. The reaction mixture was distilled using ethylbenzene to facilitate removal of acetic acid. Fractionation of the higher-boiling material gave 279 grams (84 percent yield) of 3-oxatricyclo[3.2.1.0$^{2,4}$]octane-6-methyl acetate, a colorless liquid boiling at 100.5° C. at a pressure of 2.5 millimeters of mercury and a refractive index of 1.4760 (*n* 30/D). The purity by saponification was 99.2 percent and the infrared spectrum was consistent with the assigned structure (strong epoxide band at 11.75μ, and practically no absorption in the OH region, i.e., 2.8–3.0μ). Epoxides of this structure do not react quantitatively with hydrogen bromide—for example, the above very pure epoxide gave only a 24 percent purity by this method.

EXAMPLE III

*Preparation of bicyclo[2.2.1]-5-heptene-2 methyl bicyclo[2.2.1]-5-heptene-2-carboxylate*

To a solution of 12.8 grams of aluminum isopropylate in 75 cc. of dry benzene was added over a period of one hour and ten minutes 256 grams of bicyclo[2.2.1]-5-heptene-2-carboxaldehyde at a temperature of 35° C. After standing overnight at room temperature, the catalyst was neutralized with 13.6 grams of acetic acid and the reaction mixture was distilled under reduced pressure. There was obtained 200 grams (78 percent yield) of bicyclo-[2.2.1]-5-hephene-2-methyl bicyclo[2.2.1]-5-heptene-2-carboxylate having a boiling range of 128° C. at a pressure of 2.5 millimeters of mercury to 139° C. at a pressure of 4.0 millimeters of mercury and a refractive index range of 1.5026–1.5060 (*n* 30/D). *Analysis.*—Calc'd for $C_{16}H_{20}O_2$: C, 78.65; H, 8.25. Found: C, 79.01; H, 8.53. Purity by saponification 101 percent. The infrared spectrum was consistent with the assigned structure.

EXAMPLE IV

*Preparation of 3-oxatricyclo[3.2.1.0$^{2,4}$]octane-6-methyl 3-oxatricyclo[3.2.1.0$^{2,4}$]octane-6-carboxylate*

A solution (447 grams) of peracetic acid (28.6 percent) in ethyl acetate was added over a period of 1.3 hours to 164 grams of bicyclo[2.2.1]-5-heptene-2-methyl bicyclo[2.2.1]-5-heptene-2-carboxylate at a temperature of 40° C. The reaction was exothermic and required cooling. After an additional two-hour reaction period slightly over the theoretical amount of peracetic acid had been consumed. The reaction mixture was distilled (after adding 600 grams of ethylbenzene) to remove the volatiles. The residue product (189 grams) after stripping to a kettle temperature of 110° C. at a pressure of 7 millimeters of mercury was a white crystalline solid diepoxide (quantitative yield). Recrystallization of the crude product from ethanol gave a 58 percent yield of analytically pure diepoxide, M.P. 119.5° C.; purity by saponification, 100.6 percent. Calc'd for $C_{16}H_{20}O_4$: C, 69.54; H, 7.29. Found: C, 69.98; H, 6.96.

The foregoing detailed description has been given for clearness of understanding of the present invention and no necessary limitations are to be understood therefrom except as such limitations appear in the claims.

EXAMPLE V

*Preparation of bicyclo[2.2.1]hept-2-ene-5-methyl allyl ether*

From a conventional Diels-Adler condensation of diallyl ether with dicyclopentadiene at 200° C. for five hours there was obtained, in low yield, bicyclo[2.2.1]hept-2-ene-5-methyl allyl ether, colorless liquid, B.P. 72–73° C./6 mm., $n$ 30/D 1.4721–1.4739.

EXAMPLE VI

*Preparation of 3-oxatricyclo[3.2.1.0$^{2,4}$]octane-6-methyl allyl ether*

To 111 grams of bicyclo[2.2.1]hept-2-ene-5-methyl allyl ether which was stirred and maintained at 40° C. by means of an ice-water bath there was added over a period of 45 minutes 237 grams of a 23.9 percent solution of peracetic acid in ethyl acetate. After an additional hour at 40° C. the reaction was essentially complete as indicated by a titration for peracetic acid. The ethyl acetate, acetic acid and excess peracetic acid were azeotropically removed with ethylbenzene and the residue was fractionally distilled to give 83 g. of 3-oxatricyclo[3.2.1.0$^{2,4}$]octane-6-methyl allyl ether, colorless liquid, B.P. 85–95° C./2 mm., $n$ 30/D 1.4844–1.4865.

EXAMPLE VII

*Preparation of bicyclo[2.2.1]hept-2-ene-5-methyl glycidyl ether*

A three-liter hydrogenation bomb was charged with 570 grams of allyl glycidyl ether and 330 grams of dicyclopentadiene, sealed, and heated to 200° C. for five hours. The contents of the bomb were then fractionally distilled to give 340 grams of recovered allyl glycidyl ether and 300 grams of bicyclo[2.2.1]hept-2-ene-5-methyl glycidyl ether, colorless liquid, B.P. 81–82° C./1.5 mm., $n$ 30/D 1.4825. The purity by epoxide analysis (pyridine hydrochloride method) was 95 percent.

EXAMPLE VIII

*Preparation of 3-oxatricyclo[3.2.1.0$^{2,4}$]octane-6-methyl glycidyl ether*

To 139 grams of bicyclo[2.2.1]hept-2-ene-5-methyl glycidyl ether which was maintained with stirring at 40° C. by means of an ice-water bath there was added over a period of 55 minutes 270 grams of a 23.9 percent solution of peracetic acid in ethyl acetate. After an additional hour and a half at 40° C. the reaction was essentially complete as indicated by a titration for peracetic acid. The volatiles were removed by co-distillation with ethylbenzene and the residue was fractionally distilled on a 1⅛ x 8" column packed with glass helices to give 3-oxatricyclo[3.2.1.0$^{2,4}$]octane-6-methyl glycidyl ether, colorless liquid, B.P. 104° C./0.25 mm., $n$ 30/D 1.4886.

*Analysis.*—Calc'd for $C_{11}H_{16}O_3$: C, 67.33; H, 8.22. Found: C, 67.30; H, 8.36.

What is claimed is:

1. A compound of the formula:

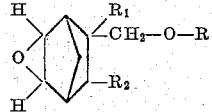

wherein $R_1$ and $R_2$ are selected from the group consisting of hydrogen and alkyl up to 18 carbon atoms; and R contains up to 18 carbon atoms and is selected from the group consisting of alkyl, alkenyl, alkoxyalkyl, carbocyclic aryl, epoxyalkyl, epoxycycloalkyl, epoxycycloalkylalkyl, epoxybicycloalkyl, epoxybicycloalkylalkyl, epoxycycloalkylcarbonyl and epoxybicycloalkylcarbonyl.

2. 3-oxatricyclo[3.2.1.0$^{2,4}$]octane-6-methyl alkyl ether wherein said alkyl contains up to 18 carbon atoms.

3. 3-oxatricyclo[3.2.1.0$^{2,4}$]octane - 6 - methyl alkenyl ether wherein said alkenyl contains up to 18 carbon atoms.

4. 3-oxatricyclo[3.2.1$^{2,4}$] octane-6-methyl epoxyalkyl ether wherein said epoxyalkyl contains up to 18 carbon atoms.

5. 3-oxatricyclo[3.2.1.0$^{2,4}$]octane-6-methyl epoxycycloalkyl ether wherein said epoxycycloalkyl contains up to 18 carbon atoms.

6. 3-oxatricyclo[3.2.1.0$^{2,4}$]octane-6-methyl epoxycycloalkylalkyl ether wherein said epoxycycloalkylalkyl contains up to 18 carbon atoms.

7. 3-oxatricyclo[3.2.1.0$^{2,4}$]octane-6-methyl epoxybicycloalkylalkyl ether wherein said epoxybicycloalkylalkyl contain up to 18 carbon atoms.

8. 3-oxatricyclo[3.2.1.0$^{2,4}$]octane-6-methyl epoxycycloalkanemonocarboxylate wherein said epoxycycloalkanemonocarboxylate contains up to 18 carbon atoms.

9. 3-oxatricyclo[3.2.1.0$^{2,4}$]octane-6-methyl epoxybicycloalkanemonocarboxylate wherein said epoxybicycloalkanemonocarboxylate contains up to 18 carbon atoms.

10. 3-oxatricyclo[3.2.1.0$^{2,4}$]octane-6-methyl 3-oxatricyclo[3.2.1.0$^{2,4}$]octane-6-carboxylate.

11. 3-oxatricyclo[3.2.1$^{2,4}$]octane-6-methyl allyl ether.

12. 3-oxatricyclo[3.2.1.0$^{2,4}$]octane - 6-methyl glycidyl ether.

References Cited by the Examiner

Arbuzov et al.: J. Applied Chem., USSR, pages 57–59 (1956).

IRVING MARCUS, *Primary Examiner.*